United States Patent
Liu et al.

(10) Patent No.: US 9,013,836 B1
(45) Date of Patent: Apr. 21, 2015

(54) METHOD AND SYSTEM FOR PROVIDING AN ANTIFERROMAGNETICALLY COUPLED RETURN POLE

(71) Applicant: Western Digital (Fremont), LLC, Fremont, CA (US)

(72) Inventors: Feng Liu, San Ramon, CA (US); Daniele Mauri, San Jose, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 0 days.

(21) Appl. No.: 13/894,281

(22) Filed: May 14, 2013

Related U.S. Application Data

(60) Provisional application No. 61/807,542, filed on Apr. 2, 2013.

(51) Int. Cl.
*G11B 5/127* (2006.01)
*G11B 5/147* (2006.01)
*G11B 5/84* (2006.01)

(52) U.S. Cl.
CPC . *G11B 5/147* (2013.01); *G11B 5/84* (2013.01)

(58) Field of Classification Search
CPC ... G11B 5/1278; G11B 5/3116; G11B 5/3903
USPC ............. 360/125.03, 125.12, 125.16, 125.26, 360/319
See application file for complete search history.

(56) References Cited

U.S. PATENT DOCUMENTS

| | | | |
|---|---|---|---|
| 4,873,599 A * | 10/1989 | Sueoka | 360/125.12 |
| 5,621,592 A | 4/1997 | Gill et al. | |
| 5,750,275 A | 5/1998 | Katz et al. | |
| 5,804,250 A | 9/1998 | Yang | |
| 5,838,521 A | 11/1998 | Ravipati | |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,491 A | 3/2000 | Lin | |

(Continued)

FOREIGN PATENT DOCUMENTS

JP 2002-298314 10/2002

OTHER PUBLICATIONS

Feng Liu, et al., U.S. Appl. No. 12/978,145, filed Dec. 23, 2010, 19 pages.

(Continued)

*Primary Examiner* — Angel Castro

(57) ABSTRACT

A method and system provide a magnetic head having an air-bearing surface (ABS). The magnetic head includes a read transducer and a write transducer. The read transducer includes a first shield and a read sensor. The write transducer includes a main pole, at least one coil for energizing the main pole and a return pole between the read sensor and the main pole. The return pole includes an antiparallel coupling (AC) pole structure. The AC pole structure includes a plurality of ferromagnetic layers interleaved with at least one nonmagnetic layer. The ferromagnetic layers and the nonmagnetic spacer layer(s) are substantially parallel. The ferromagnetic layers and the nonmagnetic spacer layer(s) are substantially perpendicular to the ABS. The magnetic moment of each of the ferromagnetic layers is aligned antiparallel with the magnetic moment of a nearest neighbor of the ferromagnetic layers.

16 Claims, 6 Drawing Sheets

(56) References Cited

U.S. PATENT DOCUMENTS

| | | |
|---|---|---|
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,087,027 A | 7/2000 | Hoshiya et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,129,957 A | 10/2000 | Xiao et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,259,583 B1 | 7/2001 | Fontana, Jr. et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,292,334 B1 | 9/2001 | Koike et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,315,839 B1 | 11/2001 | Pinarbasi et al. |
| 6,317,290 B1 | 11/2001 | Wang et al. |
| 6,317,297 B1 | 11/2001 | Tong et al. |
| 6,322,640 B1 | 11/2001 | Xiao et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,358,635 B1 | 3/2002 | Min et al. |
| 6,359,779 B1 | 3/2002 | Frank, Jr. et al. |
| 6,369,983 B1 | 4/2002 | Hong |
| 6,373,667 B1 | 4/2002 | Han et al. |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,413,325 B1 | 7/2002 | Shimazawa et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,015 B2 | 8/2002 | Ju et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,437,949 B1 | 8/2002 | Macken et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,385 B1 | 9/2002 | Shimazawa et al. |
| 6,452,742 B1 | 9/2002 | Crue et al. |
| 6,452,765 B1 | 9/2002 | Mahvan et al. |
| 6,456,465 B1 | 9/2002 | Louis et al. |
| 6,456,467 B1 | 9/2002 | Mao et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,478,884 B2 | 11/2002 | Shimazawa et al. |
| 6,479,096 B1 | 11/2002 | Shi et al. |
| 6,482,657 B2 | 11/2002 | Shimazawa |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,496,335 B2 | 12/2002 | Gill |
| 6,504,676 B1 | 1/2003 | Hiner et al. |
| 6,512,657 B2 | 1/2003 | Heist et al. |
| 6,512,659 B1 | 1/2003 | Hawwa et al. |

(56) References Cited

U.S. PATENT DOCUMENTS

| | | | |
|---|---|---|---|
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,628,478 B2 | 9/2003 | Gill |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,724,581 B2 | 4/2004 | Westwood |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,048 B2 | 6/2004 | Li et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,796 B2 | 9/2004 | Shukh et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,409 B2 | 10/2004 | Michel et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,818,330 B2 | 11/2004 | Shukh et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,848,169 B2 | 2/2005 | Shin et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,876,507 B2 | 4/2005 | Chen et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,927,952 B2 | 8/2005 | Shimizu et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,965,494 B2 * | 11/2005 | Campbell et al. ........ 360/125.04 |
| 6,967,823 B2 | 11/2005 | Nakamoto et al. |
| 6,969,989 B1 | 11/2005 | Mei |
| 6,975,486 B2 | 12/2005 | Chen et al. |
| 6,980,403 B2 | 12/2005 | Hasegawa |
| 6,987,643 B1 | 1/2006 | Seagle |
| 6,989,962 B1 | 1/2006 | Dong et al. |
| 6,989,972 B1 | 1/2006 | Stoev et al. |
| 6,998,061 B1 | 2/2006 | Cross |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,029,771 B2 | 4/2006 | Hasegawa et al. |
| 7,035,046 B1 | 4/2006 | Young et al. |
| 7,041,985 B1 | 5/2006 | Wang et al. |
| 7,046,487 B2 | 5/2006 | Terunuma |
| 7,046,490 B1 | 5/2006 | Ueno et al. |
| 7,054,113 B1 | 5/2006 | Seagle et al. |
| 7,057,853 B2 | 6/2006 | Okada et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,158,351 B2 | 1/2007 | Nakamoto et al. |
| 7,166,173 B2 | 1/2007 | Beach |
| 7,170,723 B2 | 1/2007 | Taguchi |
| 7,170,725 B1 | 1/2007 | Zhou et al. |
| 7,177,117 B1 | 2/2007 | Jiang et al. |
| 7,180,712 B1 | 2/2007 | Li et al. |

(56) References Cited

U.S. PATENT DOCUMENTS

| | | |
|---|---|---|
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,270,896 B2 | 9/2007 | Parkin |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,295,401 B2 | 11/2007 | Jayasekara et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,324,309 B1 | 1/2008 | Wiesen et al. |
| 7,333,295 B1 | 2/2008 | Medina et al. |
| 7,337,530 B1 | 3/2008 | Stoev et al. |
| 7,342,751 B2 | 3/2008 | Nagasaka et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,369,360 B2 * | 5/2008 | Vas'ko et al. ............ 360/125.12 |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,382,574 B2 | 6/2008 | Li et al. |
| 7,386,933 B1 | 6/2008 | Krounbi et al. |
| 7,389,577 B1 | 6/2008 | Shang et al. |
| 7,394,620 B2 * | 7/2008 | Taguchi ................... 360/125.03 |
| 7,417,832 B1 | 8/2008 | Erickson et al. |
| 7,419,891 B1 | 9/2008 | Chen et al. |
| 7,426,091 B2 | 9/2008 | Okada et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,443,639 B2 | 10/2008 | Parkin |
| 7,444,740 B1 | 11/2008 | Chung et al. |
| 7,446,979 B2 | 11/2008 | Jayasekara |
| 7,457,080 B2 | 11/2008 | Watabe et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,394 B2 | 6/2009 | Sasaki et al. |
| 7,551,406 B1 | 6/2009 | Thomas et al. |
| 7,552,523 B1 | 6/2009 | He et al. |
| 7,554,765 B2 | 6/2009 | Shukh et al. |
| 7,554,767 B1 | 6/2009 | Hu et al. |
| 7,561,379 B2 | 7/2009 | Li et al. |
| 7,583,466 B2 | 9/2009 | Kermiche et al. |
| 7,595,967 B1 | 9/2009 | Moon et al. |
| 7,599,154 B2 | 10/2009 | Sbiaa et al. |
| 7,606,007 B2 | 10/2009 | Gill |
| 7,606,010 B2 | 10/2009 | Parkin |
| 7,639,457 B1 | 12/2009 | Chen et al. |
| 7,652,854 B2 | 1/2010 | Kagami et al. |
| 7,656,611 B2 | 2/2010 | Liu et al. |
| 7,660,080 B1 | 2/2010 | Liu et al. |
| 7,666,467 B2 | 2/2010 | Parkin |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,773,341 B2 | 8/2010 | Zhang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,807,218 B2 | 10/2010 | Parkin |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,859,797 B2 | 12/2010 | Hoshino et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,889,457 B2 * | 2/2011 | Yazawa et al. ........... 360/125.26 |
| 7,906,231 B2 | 3/2011 | Parkin |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,933,096 B2 * | 4/2011 | Allen et al. .............. 360/125.26 |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,049,997 B2 | 11/2011 | Miyauchi et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,089,734 B2 | 1/2012 | Miyauchi et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,743 B2 | 2/2012 | Ohta et al. |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |

(56) References Cited

U.S. PATENT DOCUMENTS

| | | |
|---|---|---|
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,402,635 B2 | 3/2013 | Degawa et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,451,567 B2 | 5/2013 | Zhou et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,147 B2 | 6/2013 | Singleton et al. |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,649,124 B2 * | 2/2014 | Zou et al. ............... 360/125.26 |
| 8,665,561 B1 | 3/2014 | Knutson et al. |

(56) References Cited

U.S. PATENT DOCUMENTS

| | | |
|---|---|---|
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 2001/0043446 A1 | 11/2001 | Barlow et al. |
| 2002/0064002 A1 | 5/2002 | Gill |
| 2002/0149886 A1 | 10/2002 | Gill |
| 2004/0004786 A1 | 1/2004 | Shukh et al. |
| 2004/0120074 A1 | 6/2004 | Okada et al. |
| 2004/0196681 A1 | 10/2004 | Xiao et al. |
| 2005/0013044 A1 | 1/2005 | Hirata et al. |
| 2005/0264948 A1 | 12/2005 | Nakamoto et al. |
| 2006/0002015 A1 | 1/2006 | Gill et al. |
| 2006/0003185 A1 | 1/2006 | Parkin |
| 2006/0044682 A1 | 3/2006 | Le et al. |
| 2006/0109592 A1 | 5/2006 | Watanabe et al. |
| 2006/0119981 A1 | 6/2006 | Li et al. |
| 2007/0019341 A1 | 1/2007 | Mizuno et al. |
| 2007/0053114 A1 | 3/2007 | Uesugi et al. |
| 2007/0111332 A1 | 5/2007 | Zhao et al. |
| 2007/0195467 A1 | 8/2007 | Gill |
| 2008/0013221 A1 | 1/2008 | Ohta et al. |
| 2008/0179699 A1 | 7/2008 | Horng et al. |
| 2008/0239542 A1 | 10/2008 | Yuasa et al. |
| 2009/0027810 A1 | 1/2009 | Horng et al. |
| 2009/0052092 A1 | 2/2009 | Zhou et al. |
| 2009/0128944 A1 | 5/2009 | Jang et al. |
| 2009/0168240 A1 | 7/2009 | Hsiao et al. |
| 2009/0174971 A1 | 7/2009 | Tsuchiya et al. |
| 2009/0279213 A1 | 11/2009 | Wu et al. |
| 2010/0039734 A1 | 2/2010 | Hara et al. |
| 2010/0079917 A1 | 4/2010 | Miyauchi et al. |
| 2010/0214692 A1 | 8/2010 | Kief et al. |
| 2010/0290157 A1 | 11/2010 | Zhang et al. |
| 2010/0320076 A1 | 12/2010 | Zhao et al. |
| 2011/0086240 A1 | 4/2011 | Xiang et al. |
| 2011/0097601 A1 | 4/2011 | Bai et al. |
| 2011/0249365 A1 | 10/2011 | Zeltser et al. |
| 2011/0273802 A1 | 11/2011 | Zhou et al. |
| 2011/0279923 A1 | 11/2011 | Miyauchi et al. |
| 2011/0317313 A1 | 12/2011 | Miyauchi et al. |
| 2012/0087045 A1 | 4/2012 | Yanagisawa et al. |
| 2012/0087046 A1 | 4/2012 | Yanagisawa et al. |
| 2012/0111826 A1 | 5/2012 | Chen et al. |
| 2012/0134057 A1 | 5/2012 | Song et al. |
| 2012/0147504 A1 | 6/2012 | Zhou et al. |
| 2012/0216378 A1 | 8/2012 | Emley et al. |
| 2012/0237878 A1 | 9/2012 | Zeng et al. |
| 2012/0250189 A1 | 10/2012 | Degawa et al. |
| 2012/0281320 A1 | 11/2012 | Singleton et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

OTHER PUBLICATIONS

Yimin Guo, et al., U.S. Appl. No. 13/607,593, filed Sep. 7, 2012, 18 pages.

Rongfu Xiao, et al., U.S. Appl. No. 13/607,624, filed Sep. 7, 2012, 28 pages.

* cited by examiner

METHOD AND SYSTEM FOR PROVIDING AN ANTIFERROMAGNETICALLY COUPLED RETURN POLE

CROSS-REFERENCE TO RELATED APPLICATIONS

This application claims priority to provisional U.S. Patent Application Ser. No. 61/807,542, filed on Apr. 2, 2013, which is hereby incorporated by reference in its entirety.

BACKGROUND

FIG. 1 depicts a side view of a conventional magnetic recording head. The conventional magnetic recording head 10 includes a read transducer 12 and a write transducer 20. The conventional read transducer 12 includes shields 14 and 18 and sensor 16. The read sensor 16 is typically a giant magnetoresistive (GMR) sensor or tunneling magnetoresistive (TMR) sensor. The write transducer 20 includes a first, or return, pole 22, coils 24 and 32, back gap 26, auxiliary pole 28, main pole 30 and shield 344. The back gap 26 may be used to connect the return pole 22 with the auxiliary pole 28 and, therefore, the main pole 30. In addition, although not shown, the shield 18 may be an antiferromagnetically coupled shield. For example, the shield 18 may include ferromagnetic layers separated by a nonmagnetic spacer layer configured such that the magnetic moments of the ferromagnetic layers are antiferromagnetically coupled. In addition, an antiferromagnetic (AFM) layer may also be provided in the shield 18.

Although the conventional magnetic recording head 10 functions, there are drawbacks. In particular, the first pole 22 may be unstable. For example, the first pole 22 may be magnetically dynamic. In other words, the first pole 22 may be magnetically active even if there is no current driven through the coils 24 and 32. Further, magnetic coupling between the first pole 22 and the shield 18 may be a source of reader instability. Accordingly, what is needed is a system and method for improving the performance of a magnetic recording head.

DETAILED DESCRIPTION OF THE PREFERRED EMBODIMENTS

Figure 1:
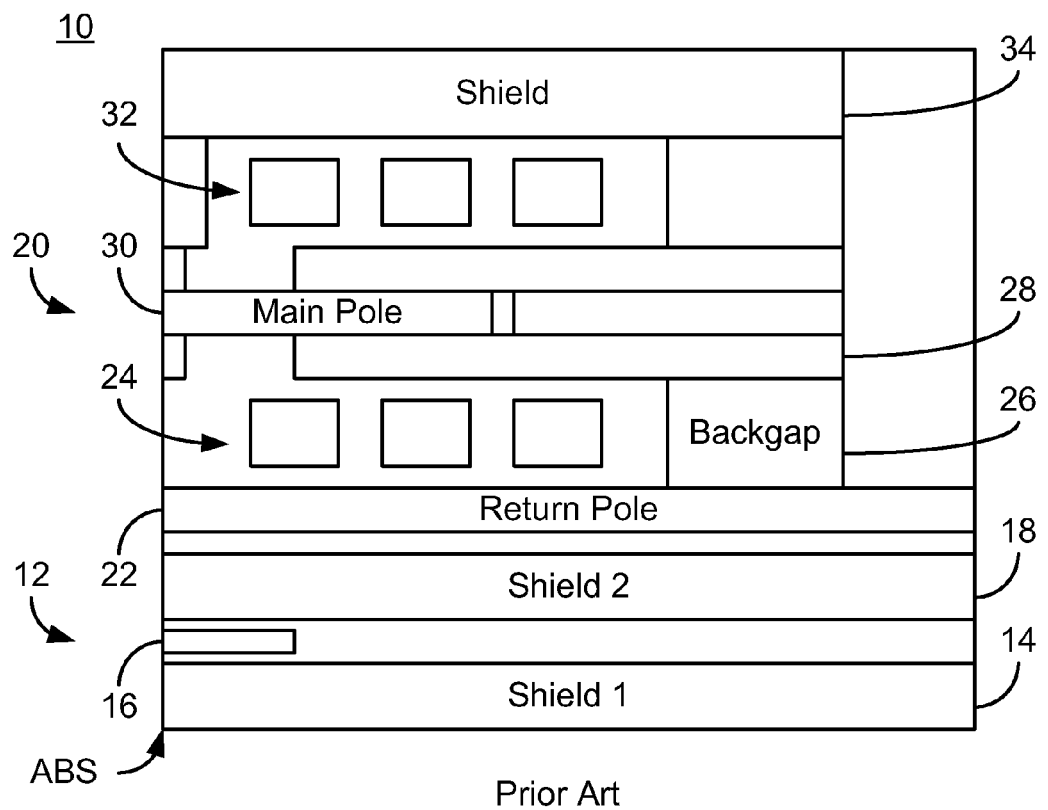
FIG. 1 depicts a conventional magnetic recording head.
Figure 2:
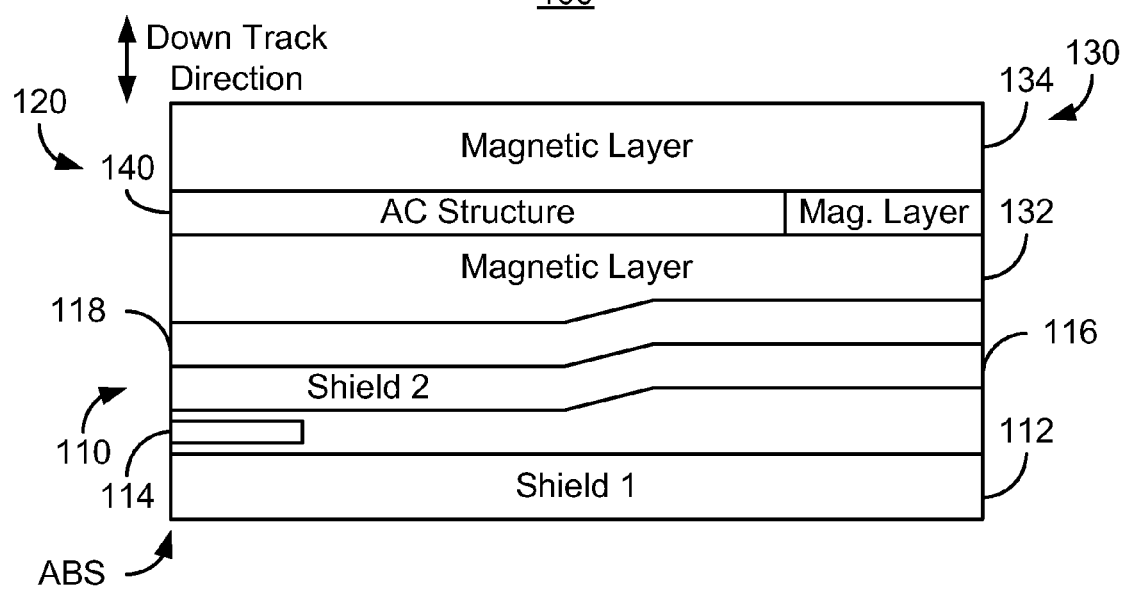
FIG. 2 depicts an exemplary embodiment of a magnetic recording head.

FIG. 2 depicts an ABS view of a portion of an exemplary embodiment of a magnetic recording head 100. For clarity, FIG. 2 is not to scale. The magnetic recording head 100 includes a read transducer 110 and a writer transducer 120. For simplicity, only a portion of the write transducer 120 is shown. The transducer 110 includes shields 112 and 116 as well as a read sensor 114. The sensor 114 shown is a GMR or TMR sensor. Thus, the sensor 114 may include a pinning layer, a pinned, a nonmagnetic spacer layer, a free layer, and a capping layer. For simplicity, these layers are not separately labeled in FIG. 2. The sensor 14 may also include seed layer(s) (not shown). Although an AFM layer used to pin the magnetic moment of the pinned layer is shown, in other embodiments, the pinning layer may be omitted or may use a different pinning mechanism. The pinned layer and free layer are each shown as a single layer, but may include multiple layers including but not limited to a synthetic antiferromagnetic (SAF) structure. The nonmagnetic spacer layer may be a conductive layer, a tunneling barrier layer, or other analogous layer. Although depicted as a GMR or TMR sensor, in other embodiments, other structures and other sensing mechanisms may be used for the sensor.

The read transducer 110 may also include magnetic bias structures, which are not shown in FIG. 2. In some embodiments, these magnetic bias structures may be soft bias structures fabricated with soft magnetic material(s). In other embodiments, other magnetic bias structures including but not limited to hard magnetic bias structures might be used.

The shield 116 for the magnetic read transducer 110 may be an antiferromagnetically coupled (AFC) shield. The shield 110 may include ferromagnetic layers interleaved with nonmagnetic spacer layer(s). In addition, a pinning layer, such as an antiferromagnetic layer, may also be included. The nonmagnetic spacer layer may be Ru, which allows the magnetic moments of the ferromagnetic layers to be coupled antiparallel, for example through an RKKY coupling. In some embodiments, the ferromagnetic layers are multilayers. For example a ferromagnetic layer may be a bilayer including a NiFe layer and $Co_xFe_{1-x}$ layer.

In some embodiments, a piggyback layer 118 is included between the read transducer 110 and the write transducer 120. The piggyback layer 118 is typically a nonmagnetic layer. In some embodiments, the piggyback layer 118 may three thousand five hundred Angstroms or more thick. Without more, therefore, stray fields might penetrate further into the shield 116. However, the configuration of other portions of the magnetic recording head 100 may mitigate this issue. However, in other embodiments, the piggyback layer 118 may be omitted. In such embodiments, the return pole 130 may adjoin the shield 116.

The write transducer 120 includes a main pole (not shown in FIG. 2) as well as one or more coils (not shown in FIG. 2) for energizing the main pole. In addition, the write transducer 120 includes a return pole 130. In some embodiments, the return pole 130 may be coupled to the main pole through a back gap (not shown). The return pole 130 includes an antiparallel coupling (AC) structure 140 as well as optional additional magnetic layers 132 and 134. In some embodiments, the additional magnetic layers 132 and/or 134 may be omitted. The AC structure 140 includes at least two ferromagnetic layers interleaved with and sandwiching at least one nonmagnetic layer. For simplicity, these layers are not shown in FIG. 2. For example, the AC structure 140 may include two ferromagnetic layers separated by a nonmagnetic layer. In other embodiments, the AC structure 140 may include three ferromagnetic layers separated by two nonmagnetic layers or four ferromagnetic layers separated by three nonmagnetic layers. Other numbers of ferromagnetic layers and nonmagnetic layers may be used in other embodiments. As can be seen in FIG.

2, the AC structure 140 is perpendicular to the ABS. Stated differently, the plane of the AC structure, in which the lateral dimensions are large compared with the down track direction, is perpendicular to the ABS. Thus, the ferromagnetic and nonmagnetic layers in the AC structure 140 are also perpendicular to the ABS. In addition, as can be seen in FIG. 2 the AC structure 140 and thus the layers therein, are also perpendicular to the down track direction. Stated differently, the plane of the AC structure 140 and the layers therein are perpendicular to the down track direction.

The AC structure 140 is so termed because the magnetic moments of the ferromagnetic layers of the AC structure are coupled antiparallel. In some embodiments, the magnetic moments are perpendicular to the ABS. In other embodiments, the magnetic moments are perpendicular to the down track direction, in the cross track direction. For both such embodiments, the magnetic moments may be in-plane for the AC structure. In other embodiments, the magnetic moments may be in another direction. In some embodiments, the magnetic moments are antiferromagnetically coupled. For example, the magnetic moments may be coupled through an RKKY coupling that results in the magnetic moments of the ferromagnetic layers being antiferromagnetically aligned. In such embodiments, the AC structure 140 is an antiferromagnetically coupled (AFC) structure. In some embodiments, the thickness of the nonmagnetic layer(s) is configured such that the AFC coupling is at the first, second or third antiferromagnetically coupled peak of the RKKY interaction.

In some embodiments, the AC structure 140 does not extend from the ABS to the back of the pole 130, as is shown in FIG. 2. However, in other embodiments, the AFC structure may not terminate between the ABS and the back of the pole 130. In such embodiments, the AC structure 140 extends from the ABS to the back of the pole 130. In some embodiments, at least the AFC structure 140 is fabricated by sputtering. For example, the ferromagnetic layers and nonmagnetic layer(s) may be formed by alternately sputtering the desired magnetic materials, such as CoFe, and nonmagnetic material(s), such as Ru. The remaining magnetic layers 132 and 134 of the pole 130 may be plated.

The magnetic head 100 may have improved performance. The AC structure 140 may improve the stability of the return pole 130. For example, the AC structure 140 may reduce the changes in domains of the pole 130. Thus, the return pole 130 may be less magnetically active. It may be possible for the pole 130 to reach a single domain state. In such a case, the formation of domain walls in the pole 130 may be reduced and remanent dynamics of the pole 130 improved. Further, the magnetostatic coupling between the pole 130 and the shield 116 may be reduced. Consequently, stability of the read sensor 114 may be improved. Thus, performance of the writer 120 and reader 110 may be enhanced.

Figure 3:
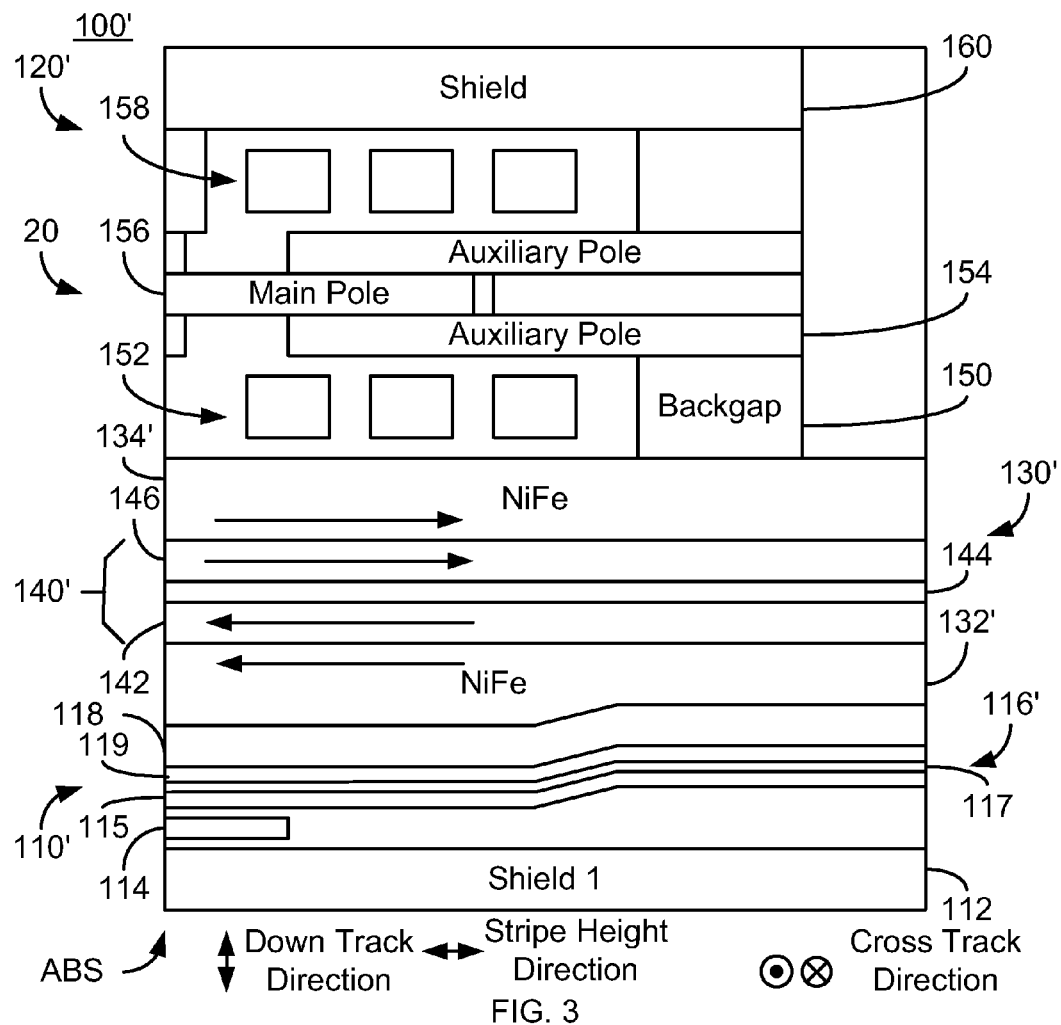
FIG. 3 depicts a side view of another exemplary embodiment of a magnetic recording head.
Figure 4:
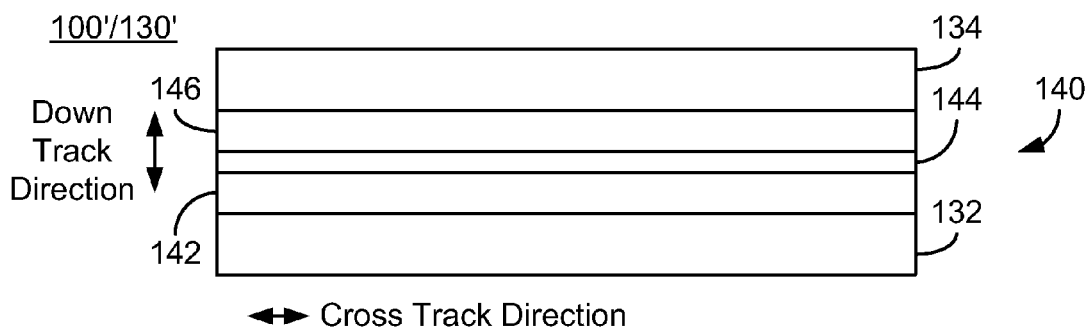
FIG. 4 depicts an ABS view of another exemplary embodiment of a magnetic recording head.

FIGS. 3 and 4 depict side and ABS views of an exemplary embodiment of a magnetic head 100'. Note that the ABS view depicted in FIG. 4 is of the return pole 130 only. For clarity, FIGS. 3 and 4 are not to scale. The magnetic recording head 100' is analogous to the magnetic head 100. Consequently, analogous components have similar labels. The magnetic recording head 100' thus includes a read transducer 110' and a writer transducer 120'. The read transducer 110' includes shields 112 and 116' as well as a read sensor 114. The sensor 114 may be a GMR or TMR sensor. In other embodiments, other structures and other sensing mechanisms may be used for the sensor. The read transducer 110' may also include magnetic bias structures (not shown).

The shield 116' for the magnetic read transducer 110' is an antiferromagnetically coupled (AFC) shield. The shield 110' thus includes ferromagnetic layers 115 and 119 interleaved with a nonmagnetic spacer layer 117. In addition, a pinning layer, such as an antiferromagnetic layer, may also be included. The nonmagnetic spacer layer 117 may be Ru, which allows the magnetic moments of the ferromagnetic layers 115 and 119 to be antiferromagnetically coupled, for example through an RKKY coupling. In some embodiments, the ferromagnetic layers 115 and 119 may be multilayers. For example a ferromagnetic layer 115 and/or 119 may be a bilayer including a NiFe layer and $Co_xFe_{1-x}$ layer.

In some embodiments, the nonmagnetic piggyback layer 118 is included between the read transducer 110' and the write transducer 120'. For example, the piggyback layer 118 may be formed of alumina. In some embodiments, the piggyback layer 118 may be three thousand five hundred Angstroms or more thick. However, in other embodiments, the piggyback layer 118 may be omitted. In such embodiments, the return pole 130' may adjoin the shield 116'.

The write transducer 120' includes a return pole 130', coils 152 and 158, back gap 150 and a main pole 156. Shield 160 may also be included. In the embodiment shown, the coils 152 and 158 may be parts separate pancake coils or may form a single helical coil. A single auxiliary pole 154 is denoted in FIG. 3. In other embodiments, the auxiliary pole 154 may be on the opposite side of the main pole 156 in the down track direction. In still other embodiments, two auxiliary poles that sandwich the main pole 156 may be used. Such an embodiment is depicted in FIG. 3. In the embodiment shown, the back gap 150 connects the main pole 156 with the return pole 130' through the auxiliary pole 154. In other embodiments, the back gap 150 may be omitted. In addition, in the embodiment shown, the return pole 130' extends further from the ABS than the back gap 150. In other embodiments, however, other configurations may be used.

Also shown in FIGS. 3-4 is the return pole 130'. The return pole 130' includes an AC structure 140' as well as optional additional magnetic layers 132 and 134. In some embodiments, the additional magnetic layers 132 and/or 134 may be omitted. The AC structure 140' includes two ferromagnetic layers 142 and 146 interleaved with and sandwiching a nonmagnetic layer 144. Other numbers of ferromagnetic layers and nonmagnetic layers may be used in other embodiments. As can be seen in FIG. 3, the magnetic moment of the layer 142 is antiparallel to the magnetic moment of the ferromagnetic layer 146. In some embodiments, the magnetic moments are antiferromagnetically coupled. Thus, the AC structure 140' may be an AFC structure 140'. For example, the magnetic moments of the layers 142 and 146 may be coupled through the nonmagnetic layer 144 via an RKKY coupling. In some embodiments, the thickness of the nonmagnetic layer 144 is configured such that the AFC coupling is at the first, second or third antiferromagnetically coupled peak of the RKKY coupling. In such embodiments, the nonmagnetic layer 144 may be a Ru layer. For the first or second peak in the RKKY coupling, the nonmagnetic layer 144 may be not more than ten Angstroms thick. For the third peak, the nonmagnetic layer 144 may be thicker, for example on the order of twenty-two through twenty-eight Angstroms. In some embodiments, the nonmagnetic layer 144 is desired to be thinner such that the first or second peak of the RKKY coupling characterizes the antiferromagnetic coupling between the layers 142 and 146. Thus, the layers 142 and 146 would be more strongly antiferromagnetically coupled. In some embodiments, the magnetic layers 142 and 146 are desired to have a thickness of at least fifty-five nanometers and not more than eighty-five nanometers. In addition, the magnetic layers 142 and 146 may be desired to be formed of CoFe.

In the embodiment shown, the magnetic moments of the ferromagnetic layers 142 and 146 are not only antiparallel, but also perpendicular to the ABS. In other embodiments, the magnetic moments may be in other directions. However, the magnetic moments are still desired to be antiparallel.

In some embodiments, the AC structure 140' extends from the ABS to the back of the pole 130', as is shown in FIG. 3. However, in other embodiments, the AFC structure may terminate between the ABS and the back of the pole 130'. In some embodiments, at least the AFC structure 140' is fabricated by sputtering. For example, the ferromagnetic layer 142 may be sputter deposited, the nonmagnetic layer 144 may then be sputtered, and the ferromagnetic layer 146 sputtered last. The remaining magnetic layers 132' and 134' of the pole 130' may be plated.

As can be seen in FIGS. 3-4, the layers 142, 144 and 146 of the AC structure 140' are substantially parallel to each other. In addition, the layers 142, 144 and 146 are substantially perpendicular to the ABS. Stated differently, the planes of the layers 142, 144 and 146 extend in the cross track and stripe height direction, with the smallest dimension being in the down track direction. In the embodiment shown, the magnetic moments of ferromagnetic layers 142 and 146 are also perpendicular to the ABS, in the stripe height direction.

The layers 132' and 134' are also ferromagnetic. In some embodiments, the layers 132' and 134' are formed of NiFe. The magnetic moments of the layers 132' and 134' are ferromagnetically coupled with the magnetic moments of the layers 142 and 146, respectively. Thus, the layers 142 and 132' have their magnetic moments antiparallel to the magnetic moments of the layers 146 and 134'.

The magnetic head 100' may have improved performance. The AC structure 140' may improve the stability of the return pole 130'. For example, the AC structure 140' may allow the return pole 130' to be less magnetically active. It may be possible for the pole 130' to reach a single domain state. In such a case, the formation of domain walls in the pole 130' may be reduced and remanent dynamics of the pole 130' improved. Further, the magnetostatic coupling between the pole 130' and the shield 116' may be reduced. Consequently, stability of the read sensor 114 may be improved. Thus, performance of the writer 120' and reader 110' may be enhanced.

Figure 5:
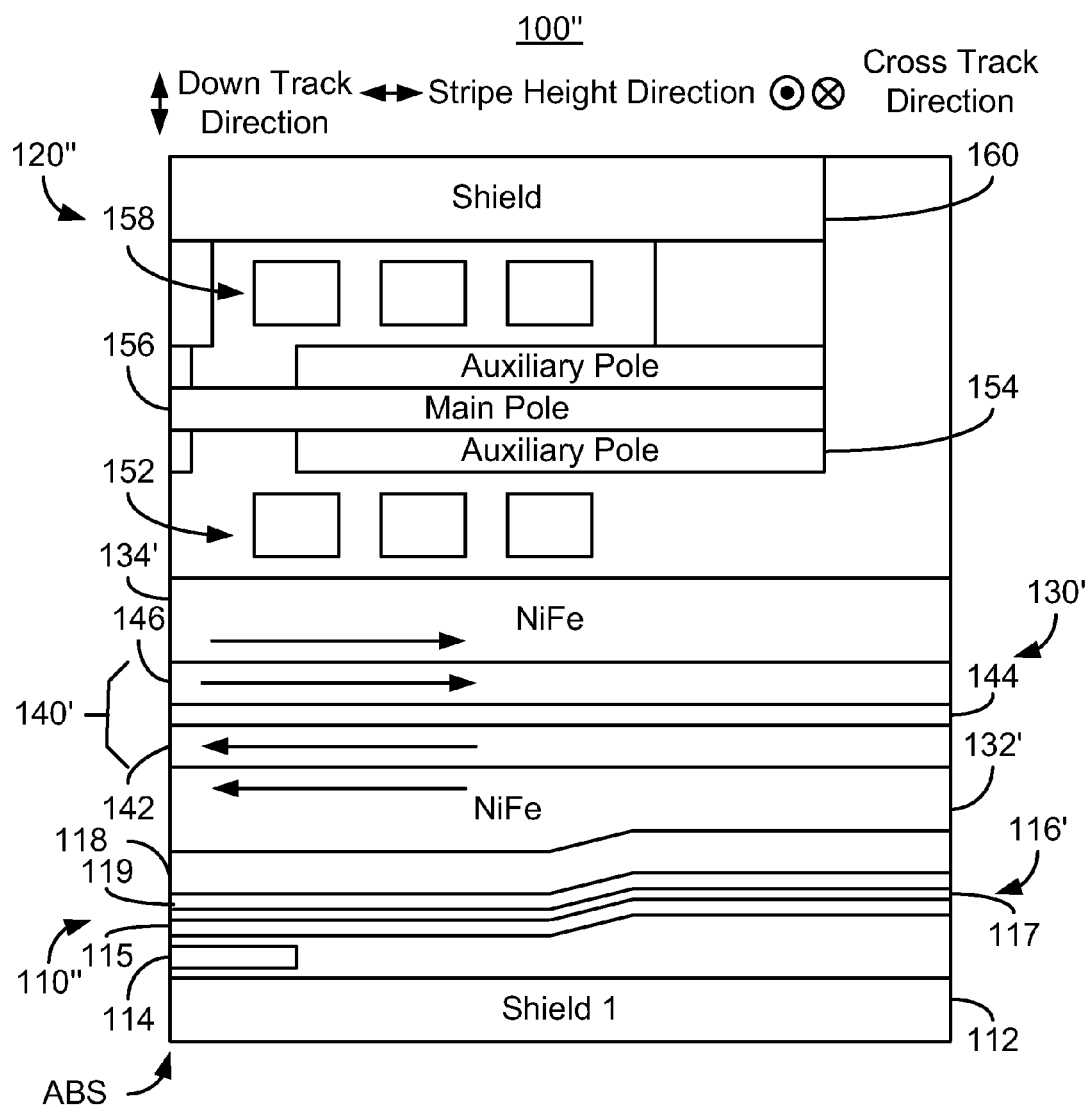
FIG. 5 depicts another exemplary embodiment of a magnetic recording head.

FIG. 5 depicts a side view of an exemplary embodiment of a magnetic head 100". For clarity, FIG. 5 is not to scale. The magnetic recording head 100" is analogous to the magnetic head 100 and 100'. Consequently, analogous components have similar labels. The magnetic recording head 100" thus includes a read transducer 110" and a writer transducer 120". The read transducer 110" includes shield 112, AFC shield 116' as well as a read sensor 114. The sensor 114 may be a GMR or TMR sensor. In other embodiments, other structures and other sensing mechanisms may be used for the sensor. The read transducer 110" may also include magnetic bias structures (not shown).

The shield 116' for the magnetic read transducer 110" is an AFC shield analogous to the AFC shield 116' shown in FIG. 3. In some embodiments, the nonmagnetic piggyback layer 118 is included between the read transducer 110" and the write transducer 120". The piggyback layer 118 is analogous to the piggyback layer 118 depicted in FIG. 3. However, in other embodiments, the piggyback layer 118 may be omitted. In such embodiments, the return pole 130' may adjoin the shield 116'.

The write transducer 120' includes a return pole 130', coils 152 and 158, auxiliary pole(s) 154, and a main pole 156. Shield 160 may also be included. The components 130', 152, 156, 158, 154 and 160 in FIG. 5 are analogous to components 130', 152, 156, 158, 154 and 160 in FIG. 3. The return pole 130' thus includes an AC structure 140' as well as optional additional magnetic layers 132' and 134'. In some embodiments, the additional magnetic layers 132' and/or 134' may be omitted. The layers 132' and 134' are ferromagnetic and may be formed of NiFe. The magnetic moments of the layers 132' and 134' are ferromagnetically coupled with the magnetic moments of the layers 142 and 146, respectively.

The AC structure 140' includes two ferromagnetic layers 142 and 146 interleaved with and sandwiching a nonmagnetic layer 144. Other numbers of ferromagnetic layers and nonmagnetic layers may be used in other embodiments. As can be seen in FIG. 5, the magnetic moment of the layer 142 is antiparallel to the magnetic moment of the ferromagnetic layer 146. In some embodiments, the magnetic moments are antiferromagnetically coupled. Thus, the AC structure 140' may be an AFC structure 140'. For example, the magnetic moments of the layers 142 and 146 may be coupled through the nonmagnetic layer 144 via an RKKY coupling. The thicknesses and constituents of the layers 142, 144 and 146 may be analogous to those shown in FIG. 3. In the embodiment shown, the magnetic moments of the ferromagnetic layers 142 and 146 are not only antiparallel, but also perpendicular to the ABS. In other embodiments, the magnetic moments may be in other directions. However, the magnetic moments are still desired to be antiparallel. The layers 142, 144 and 146 of the AC structure 140' are substantially parallel to each other. In addition, the layers 142, 144 and 146 are substantially perpendicular to the ABS.

In some embodiments, the AC structure 140' extends from the ABS to the back of the pole 130', as is shown in FIG. 5. However, in other embodiments, the AFC structure may terminate between the ABS and the back of the pole 130'. In some embodiments, at least the AFC structure 140' is fabricated by sputtering. For example, the ferromagnetic layer 142 may be sputter deposited, the nonmagnetic layer 144 may then be sputtered, and the ferromagnetic layer 146 sputtered last. The remaining magnetic layers 132' and 134' of the pole 130' may be plated. In the embodiment shown, the magnetic moments of ferromagnetic layers 142 and 146 are also perpendicular to the ABS, in the stripe height direction.

In the embodiment shown, the return pole 130' is not coupled to the main pole 156 through a back gap. Thus, the back gap 150 in the embodiment depicted in FIG. 3 is not present in the embodiment shown in FIG. 5.

The magnetic head 100" may have improved performance. The AC structure 140' may improve the stability of the return pole 130'. For example, the AC structure 140' may allow the return pole 130' to be less magnetically active. The suppression of the dynamic nature of the return pole 130' may be enhanced by the omission of the back gap. In some embodiments, the formation of domain walls in the pole 130' may be reduced and remanent dynamics of the pole 130' improved. Further, the magnetostatic coupling between the pole 130' and the shield 116' may be reduced. Consequently, stability of the read sensor 114 may be improved. Thus, performance of the writer 120" and reader 110" may be enhanced.

Figure 6:
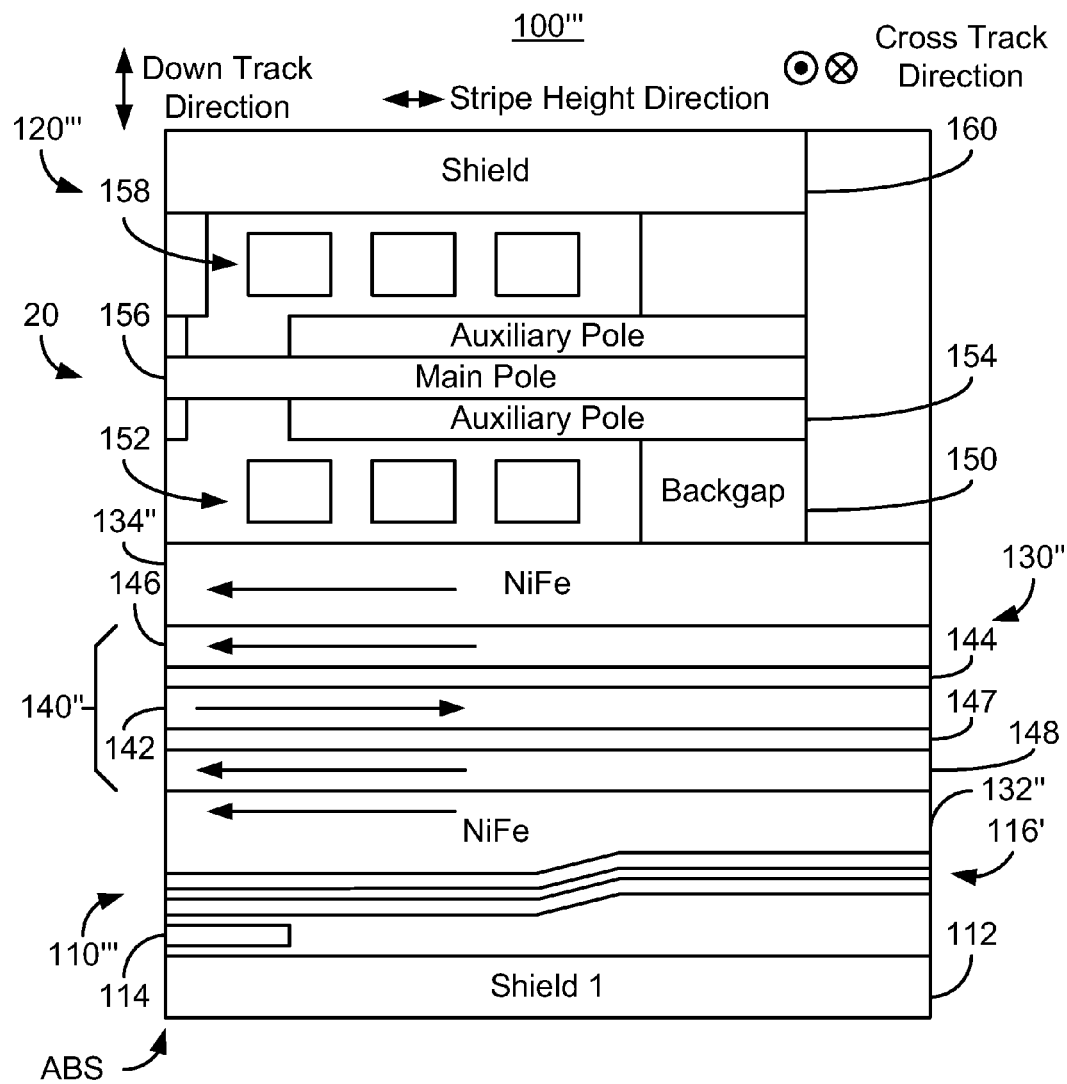
FIG. 6 depicts another exemplary embodiment of a magnetic recording head.

FIG. 6 depicts a side view of an exemplary embodiment of a magnetic head 100'''. For clarity, FIG. 6 is not to scale. The magnetic recording head 100''' is analogous to the magnetic heads 100, 100' and 100". Consequently, analogous components have similar labels. The magnetic recording head 100''' thus includes a read transducer 110''' and a writer transducer 120'''. The read transducer 110''' includes shield 112, AFC shield 116' as well as a read sensor 114. The sensor 114 may be a GMR or TMR sensor. In other embodiments, other structures and other sensing mechanisms may be used for the sensor. The read transducer 110''' may also include magnetic bias structures (not shown).

The shield 116' for the magnetic read transducer 110''' is an AFC shield analogous to the AFC shields previously shown. In the embodiment shown, the write transducer 120''' and thus the return pole 130'' adjoins the AFC shield 116'. Thus, the nonmagnetic piggyback layer depicted in previous embodiments is not shown in FIG. 6. However, in other embodiments, the piggyback layer 118 may be included.

The write transducer 120''' includes a return pole 130'', coils 152 and 158, auxiliary pole(s) 154, back gap 150 and a main pole 156. Shield 160 may also be included. The components 130'', 150, 152, 154, 156, 158 and 160 in FIG. 6 are analogous to components 130/130', 150, 152, 154, 156, 158 and 160 depicted in previous drawings. In the embodiment shown, the return pole 130'' is coupled to the main pole 156 through a back gap 150. In other embodiments, the back gap 150 may be omitted.

The return pole 130'' thus includes an AC structure 140'' as well as optional additional magnetic layers 132'' and 134''. In some embodiments, the additional magnetic layers 132'' and/or 134'' may be omitted. The layers 132'' and 134'' are ferromagnetic and may be formed of NiFe. The magnetic moments of the layers 132'' and 134'' are ferromagnetically coupled with the magnetic moments of the layers 148 and 146, respectively.

The AC structure 140'' includes three ferromagnetic layers 142, 146 and 148 interleaved with and sandwiching two nonmagnetic layers 144 and 147. Other numbers of ferromagnetic layers and nonmagnetic layers may be used in other embodiments. As can be seen in FIG. 6, the magnetic moment of a ferromagnetic layer 142, 146 and 148 is antiparallel to the magnetic moment of the nearest neighbor ferromagnetic layer. For example, the magnetic moment of the layer 148 is antiparallel to the magnetic moment of the layer 142. The magnetic moment of the layer 146 is also antiparallel to the magnetic moment of the layer 142. In some embodiments, the magnetic moments are antiferromagnetically coupled. Thus, the AC structure 140'' may be an AFC structure 140''. For example, the magnetic moments of the ferromagnetic layers 142 and 146 and the ferromagnetic layers 146 and 148 may be coupled through the nonmagnetic layers 142 and 147, respectively. This coupling may be an RKKY coupling. The thicknesses and constituents of the layers 142, 144, 146, 147 and 148 may be analogous to those shown in previous drawings. In the embodiment shown, the magnetic moments of the ferromagnetic layers 142 and 146 and the magnetic moments of the layers 142 and 148 are not only antiparallel, but also perpendicular to the ABS. In other embodiments, the magnetic moments may be in other directions. However, the magnetic moments are still desired to be antiparallel. The layers 142, 144, 146, 147 and 148 of the AC structure 140'' are substantially parallel to each other. In addition, the layers 142, 144, 146, 147 and 148 are substantially perpendicular to the ABS.

In some embodiments, the AC structure 140'' extends from the ABS to the back of the pole 130'', as is shown in FIG. 6. However, in other embodiments, the AFC structure may terminate between the ABS and the back of the pole 130''. In some embodiments, at least the AFC structure 140'' is fabricated by sputtering. For example, the layers 142, 144, 146, 147 and 148 may be sputter deposited. The remaining magnetic layers 132'' and 134'' of the pole 130'' may be plated. In the embodiment shown, the magnetic moments of ferromagnetic layers 142, 146 and 148 are also perpendicular to the ABS, in the stripe height direction.

The magnetic head 100''' may have improved performance. The AC structure 140'' may improve the stability of the return pole 130'' and the read sensor as previously discussed. In addition, the use of additional layers 147 and 148 in the AFC structure 140'' may enhance the antiferromagnetic coupling. The total magnetic moment of the return pole 130'' may also be tailored. Thus, performance of the writer 120''' and reader 110''' may be enhanced.

Figure 7:
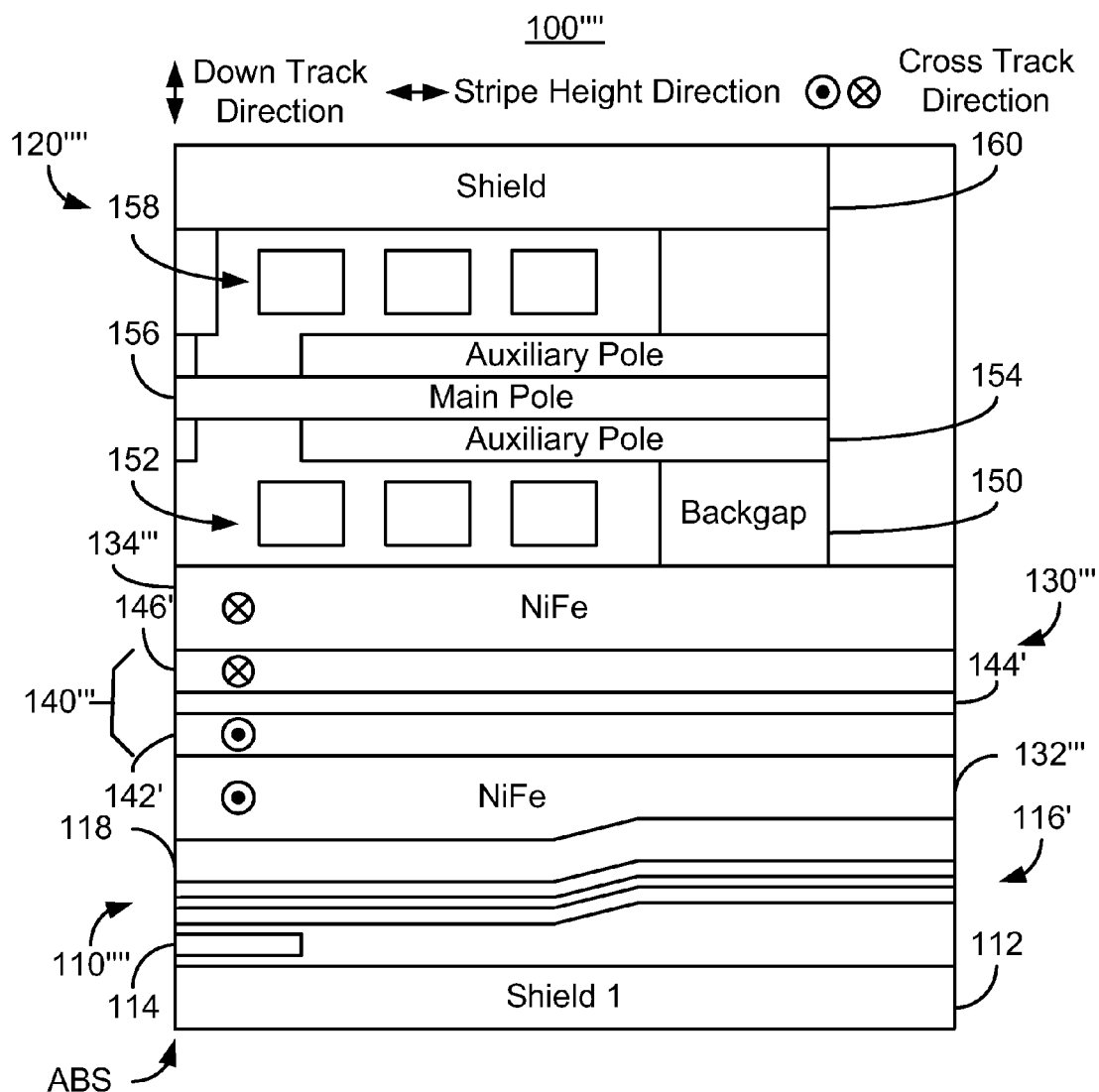
FIG. 7 depicts another exemplary embodiment of a magnetic recording head.

FIG. 7 depicts a side view of an exemplary embodiment of a magnetic head 100''''. For clarity, FIG. 7 is not to scale. The magnetic recording head 100'''' is analogous to the magnetic heads 100, 100', and 100'' and 100'''. Consequently, analogous components have similar labels. The magnetic recording head 100'''' thus includes a read transducer 110'''' and a writer transducer 120''''. The read transducer 110'''' includes shield 112, AFC shield 116' as well as a read sensor 114. The sensor 114 may be a GMR or TMR sensor. In other embodiments, other structures and other sensing mechanisms may be used for the sensor. The read transducer 110'''' may also include magnetic bias structures (not shown).

The shield 116' for the magnetic read transducer 110'''' is an AFC shield analogous to the AFC shields previously shown. In the embodiment shown, the write transducer 120'''' and thus the return pole 130''' are separated from the AFC shield 116' by a nonmagnetic piggyback layer 118. The nonmagnetic piggyback layer 118 is analogous to the piggyback layer depicted in previous drawings. However, in other embodiments, the piggyback layer 118 may be omitted.

The write transducer 120'''' includes a return pole 130''', coils 152 and 158, auxiliary pole(s) 154, back gap 150 and a main pole 156. Shield 160 may also be included. The components 130''', 150, 152, 154, 156, 158 and 160 in FIG. 7 are analogous to components 130/130'', 150, 152, 154, 156, 158 and 160 depicted in previous drawings. In the embodiment shown, the return pole 130''' is coupled to the main pole 156 through a back gap 150. In other embodiments, the back gap 150 may be omitted.

The return pole 130''' thus includes an AC structure 140''' as well as optional additional magnetic layers 132''' and 134'''. In some embodiments, the additional magnetic layers 132''' and/or 134''' may be omitted. The layers 132''' and 134''' are ferromagnetic and may be formed of NiFe. The magnetic moments of the layers 132''' and 134''' are ferromagnetically coupled with the magnetic moments of the layers 142' and 146', respectively.

The AC structure 140''' includes two ferromagnetic layers 142' and 146' interleaved with and sandwiching nonmagnetic layer 144'. Other numbers of ferromagnetic layers and nonmagnetic layers may be used in other embodiments. As can be seen in FIG. 7, the magnetic moment of a ferromagnetic layer 142' and 146' is antiparallel to the magnetic moment of the nearest neighbor ferromagnetic layer. In some embodiments, the magnetic moments are antiferromagnetically coupled. Thus, the AC structure 140''' may be an AFC structure 140'''. For example, the magnetic moments of the ferromagnetic layers 142' and 146' may be coupled through the nonmagnetic layer 142'. This coupling may be an RKKY coupling. The thicknesses and constituents of the layers 142', 144' and 146' may be analogous to those shown in previous drawings. The layers 142', 144' and 146' of the AC structure 140''' are substantially parallel to each other. In addition, the layers 142', 144' and 146' are substantially perpendicular to the ABS.

In some embodiments, the AC structure 140''' extends from the ABS to the back of the pole 130''', as is shown in FIG. 7. However, in other embodiments, the AFC structure may terminate between the ABS and the back of the pole 130'''. In some embodiments, at least the AFC structure 140''' is fabricated by sputtering. For example, the layers 142', 144' and 146' may be sputter deposited. The remaining magnetic layers 132''' and 134''' of the pole 130''' may be plated.

The magnetic head 100'''' is substantially the same as the magnetic head 100' depicted in FIGS. 3-4 except for the direction of the magnetic moments of the poles 130''' and 130'. In particular, the magnetic moments of the AC structure 140''' and the magnetic layers 132''' and 134''' are in the cross-track direction (perpendicular to the plane of the page).

The magnetic head 100'''' may have improved performance. The AC structure 140''' may improve the stability of the return pole 130''' and the read sensor as previously discussed. Thus, performance of the writer 120'''' and reader 110'''' may be enhanced. In addition, various features are highlighted in the magnetic recording heads 100, 100', 100'', 100''' and 100''''. However, various features of each of the magnetic recording heads 100, 100', 100'', 100''' and/or 100'''' may be combined.

Figure 8:
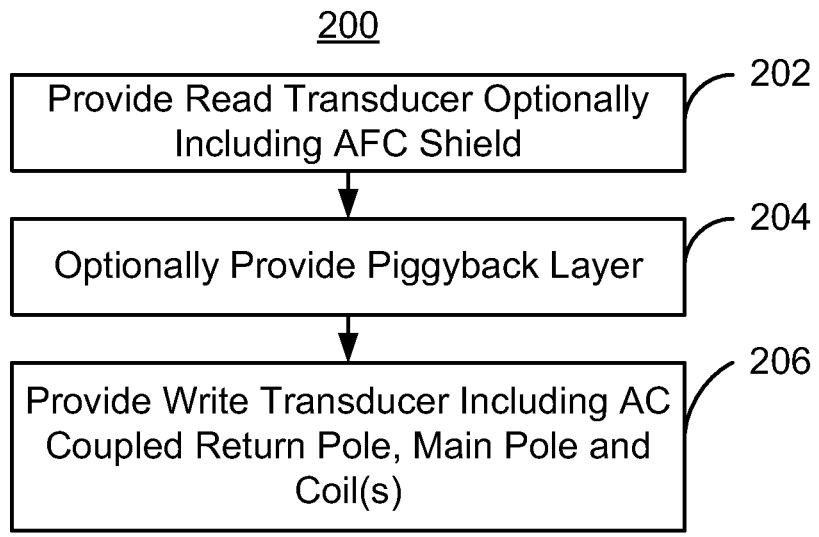
FIG. 8 is flow chart depicting an exemplary embodiment of a method for fabricating a magnetic recording head.

FIG. 8 is an exemplary embodiment of a method 200 for providing a magnetic recording head including a return pole having an AC structure. For simplicity, some steps may be omitted, interleaved, and/or combined. The method 200 is also described in the context of providing a magnetic recording head 100' depicted in FIGS. 3-4. However, the method 200 may be used to fabricate multiple magnetic recording heads at substantially the same time. The method 200 may also be used to fabricate other magnetic recording heads including but not limited to any combination of 100, 100', 100'', 100''' and/or 100''''. The method 200 is also described in the context of particular layers. A particular layer may include multiple materials and/or multiple sub-layers. The method 200 also may start after formation of other portions of the magnetic recording head.

A read transducer 110' is provided, via step 202. Step 202 includes providing the shields 112 and 116' as well as the sensor 114. Step 202 may include providing an AFC shield 116'. Thus, ferromagnetic layers interleaved with and sandwiching one or more nonmagnetic layers may be deposited in step 204. In addition, a magnetic field may be applied to align the magnetic moments of the ferromagnetic layers in the desired directions.

The piggyback layer 118 may optionally be provided in step 204. In other embodiments, step 204 may be omitted.

A write transducer is provided, via step 206. Step 206 includes providing a main pole 156, at least one coil 152/158 for energizing the main pole 156 and a return pole 130' between the read sensor 114 and the main pole 156. The return pole 130' including an AC pole structure 140'. The AC pole structure 140' includes at least two ferromagnetic layers 142 and 146 interleaved with at least one nonmagnetic layer 144. In other embodiments, step 206 includes depositing another number of ferromagnetic and nonmagnetic layers. The layers 142, 144 and 146 may be deposited by sputtering in step 206. In addition, step 206 may include aligning the magnetic moments of the ferromagnetic layers in the desired direction. In some embodiments, step 206 includes providing the AC pole structure 140' extending from the ABS to the back surface of the return pole 130'. Step 206 may also include depositing the magnetic layers 132' and 134 for the return pole 130'. The back gap 150, auxiliary pole(s) 154, and shield 160 may also be provided in step 206.

Using the method 200, the magnetic head 100, 100', 100'', 100''' and/or 100'''' may be provided. Thus, the benefits of the magnetic head(s) 100, 100', 100'', 100''', and/or 100'''' may be achieved.

Figure 9:
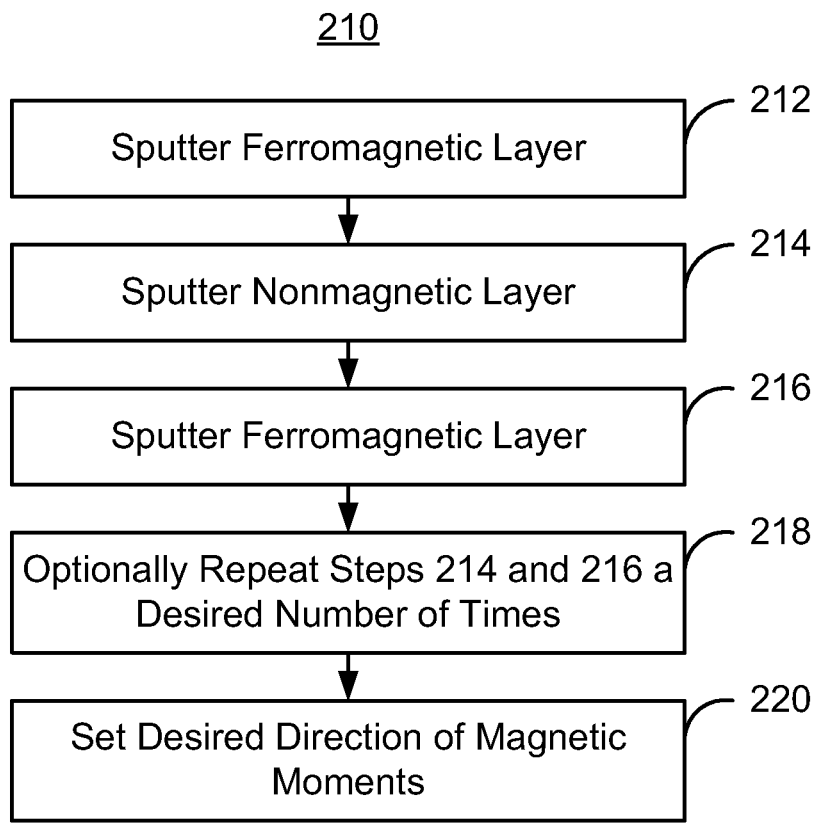
FIG. 9 is flow chart depicting an exemplary embodiment of a method for fabricating a portion of an antiparallel coupled pole.

FIG. 9 is an exemplary embodiment of a method 210 for providing an AC structure for a return pole in a write transducer. For simplicity, some steps may be omitted, interleaved, and/or combined. The method 210 is also described in the context of providing a return shield 100' depicted in FIGS. 3-4. However, the method 210 may be used to fabricate multiple return poles for multiple write transducers at substantially the same time. The method 210 may also be used to fabricate other return poles including but not limited to any combination of 130, 130', 130'', 130''' and/or 130''''. The method 210 is also described in the context of particular layers. A particular layer may include multiple materials and/or multiple sub-layers. The method 210 also may start after formation of other portions of the magnetic recording transducer. For example, the method 210 may start after the layer 132' has been plated or otherwise deposited and terminate before the layer 134' is plated or otherwise deposited.

A ferromagnetic layer 142 is deposited, via step 212. Step 212 may include sputtering a magnetic layer such as CoFe. However, in other embodiments, other materials may be used. The nonmagnetic layer 144 is deposited, via step 214. Step 214 may include sputtering a layer such as Ru. However, in other embodiments, other materials may be used. The ferromagnetic layer 146 is deposited, via step 216. Step 216 may include sputtering a magnetic layer such as CoFe. However, in other embodiments, other materials may be used. Steps 214 and 216 may optionally be repeated a desired number of times, via step 218. Thus, a desired number of ferromagnetic layers interleaved with and sandwiching nonmagnetic layers may be fabricated using the method 210. In some embodiments, the method 210 may include setting the desired direction of the magnetic moments, via step 220. Step 220 may be performed after the magnetic layer 134' is deposited.

Using the method 210, the AC structure 140, 140', 140'' and/or 140''' may be provided. Thus, the return poles 130, 130', 130'' and/or 130''' may be formed. The magnetic heads 100, 100', 100'', 100''' and/or 100'''' may be provided. Thus, the benefits of the magnetic head(s) 100, 100', 100'', 100''', and/or 100'''' may be achieved.

We claim:

1. A magnetic head having an air-bearing surface (ABS) and comprising:
    a read transducer including a first shield, a second shield and a read sensor between the first shield and the second shield, the second shield including a first ferromagnetic layer having a first magnetic moment, a nonmagnetic spacer layer, and a second ferromagnetic layer having a second magnetic moment, the nonmagnetic spacer layer residing between the first ferromagnetic layer and the second ferromagnetic layer, the first ferromagnetic layer residing between the read sensor and the nonmagnetic spacer layer, the first magnetic moment of the first ferromagnetic layer being coupled antiparallel with the second magnetic moment of the second ferromagnetic layer; and
    a write transducer including a main pole, at least one coil for energizing the main pole and a return pole between the second shield of the read transducer and the main pole, the return pole including an antiparallel coupling (AC) pole structure, the AC pole structure including a plurality of ferromagnetic layers interleaved with at least one nonmagnetic layer, the plurality of ferromagnetic layers and the at least one nonmagnetic layer being substantially parallel, the plurality of ferromagnetic layers and the at least one nonmagnetic spacer layer being substantially perpendicular to the ABS, a magnetic moment of each of the plurality of ferromagnetic layers being aligned antiparallel with the magnetic moment of a nearest neighbor of the plurality of ferromagnetic layers;

wherein the return pole is magnetically decoupled from the second shield if the return pole does not adjoin the second shield; and wherein at least one of the plurality of ferromagnetic layers is ferromagnetically coupled with the second ferromagnetic layer of the second shield if the return pole adjoins the second shield.

2. The magnetic head of claim 1 further comprising:
a nonmagnetic piggyback layer between the second shield and the return pole.

3. The magnetic head of claim 1 wherein the return pole further includes:
at least one magnetic layer adjacent to the AC pole structure.

4. The magnetic head of claim 1 wherein the return pole further includes:
a first magnetic layer and a second magnetic layer, the AC pole structure residing between the first magnetic layer and the second magnetic layer.

5. The magnetic head of claim 4 wherein the first magnetic layer and the second magnetic layer include NiFe.

6. The magnetic head of claim 1 wherein the write transducer further includes:
a back gap recessed from the ABS and coupling the main pole with the return pole.

7. The magnetic head of claim 1 wherein the return pole has an ABS facing surface and a back surface opposite to the ABS facing surface, the AC pole structure extending from the ABS facing surface to the back surface.

8. The magnetic head of claim 1 wherein the plurality of ferromagnetic layers includes a plurality of CoFe layers.

9. The magnetic head of claim 8 wherein each of the plurality of ferromagnetic layers has a thickness of at least fifty five nanometers and not more than eighty five nanometers.

10. The magnetic head of claim 1 wherein the at least one nonmagnetic layer includes Ru.

11. The head of claim 10 wherein each of the at least one nonmagnetic layer has a thickness of not more than ten Angstroms.

12. The magnetic head of claim 1 each of the plurality of ferromagnetic layers being antiferromagnetically coupled with a nearest neighbor of the plurality of ferromagnetic layers.

13. The magnetic transducer of claim 1 wherein the main pole is magnetically disconnected from the return pole.

14. A magnetic head having an air-bearing surface (ABS) and comprising:
a read transducer including a first shield, a second shield and a read sensor between the first shield and the second shield, the second shield including a first ferromagnetic layer having a first magnetic moment, a nonmagnetic spacer layer and a second ferromagnetic layer having a second magnetic moment, the nonmagnetic spacer layer residing between the first ferromagnetic layer and the second ferromagnetic layer, the first ferromagnetic layer residing between the read sensor and the nonmagnetic spacer layer, the first magnetic moment of the first ferromagnetic layer being coupled antiparallel with the second magnetic moment of the second ferromagnetic layer;
a nonmagnetic piggyback layer; and
a write transducer, the nonmagnetic piggyback layer being between the read transducer and the write transducer, the write transducer including a main pole, at least one coil for energizing the main pole, a back gap and a return pole between the read sensor and the main pole, the return pole including an ABS facing surface and a back surface opposite to the ABS facing surface, the return pole including an antiferromagnetic (AFC) pole structure and at least one NiFe magnetic layer adjoining the AFC pole structure, the AFC pole structure including a plurality of ferromagnetic layers interleaved with at least one nonmagnetic layer, the plurality of ferromagnetic layers and the at least one nonmagnetic layer being substantially parallel, the plurality of ferromagnetic layers and the at least one nonmagnetic spacer layer being substantially perpendicular to the ABS, a magnetic moment of each of the plurality of ferromagnetic layers being antiferromagnetically coupled with the magnetic moment of a nearest neighbor of the plurality of ferromagnetic layers, the AFC pole structure extending from the ABS facing surface to the back surface, the back gap recessed from the ABS and coupling the main pole with the return pole;
wherein the return pole is magnetically decoupled from the second shield.

15. A disk drive comprising:
a media;
a slider including a having an air-bearing surface (ABS) and including a read transducer and a write transducer, the read transducer including a first shield, a second shield and a read sensor between the first shield and the second shield, the second shield including a first ferromagnetic layer having a first magnetic moment, a nonmagnetic spacer layer, and a second ferromagnetic layer having a second magnetic moment, the nonmagnetic spacer layer residing between the first ferromagnetic layer and the second ferromagnetic layer, the first ferromagnetic layer residing between the read sensor and the nonmagnetic spacer layer, the first magnetic moment of the first ferromagnetic layer being coupled antiparallel with the second magnetic moment of the second ferromagnetic layer, the write transducer including a main pole, at least one coil for energizing the main pole and a return pole between the read sensor and the main pole, the return pole including an antiparallel (AC) pole structure, the AC pole structure including a plurality of ferromagnetic layers interleaved with at least one nonmagnetic layer, the plurality of ferromagnetic layers and the at least one nonmagnetic layer being substantially parallel, the plurality of ferromagnetic layers and the at least one nonmagnetic spacer layer being substantially perpendicular to the ABS, a magnetic moment of each of the plurality of ferromagnetic layers being aligned antiparallel with the magnetic moment of a nearest neighbor of the plurality of ferromagnetic layers;
wherein the return pole is magnetically decoupled from the second shield if the return pole does not adjoin the second shield; and
wherein at least one of the plurality of ferromagnetic layers is ferromagnetically coupled with the second ferromagnetic layer of the second shield if the return pole adjoins the second shield.

16. The disk drive of claim 15 wherein the main pole is magnetically disconnected from the return pole.

* * * * *